(12) United States Patent
Bancheri et al.

(10) Patent No.: US 10,100,656 B2
(45) Date of Patent: Oct. 16, 2018

(54) COATED SEAL SLOT SYSTEMS FOR TURBOMACHINERY AND METHODS FOR FORMING THE SAME

(71) Applicant: GENERAL ELECTRIC COMPANY, Schenectady, NY (US)

(72) Inventors: Stephen Francis Bancheri, Albany, NY (US); Venkat Subramaniam Venkataramani, Clifton Park, NY (US); Glen Harold Kirby, Liberty Township, OH (US); Neelesh Nandkumar Sarawate, Niskayuna, NC (US); Nicholas Edward Antolino, Schenectady, NY (US); Edip Sevincer, Watervliet, NY (US); Anthony Christopher Marin, Saratoga Springs, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 524 days.

(21) Appl. No.: 14/834,866

(22) Filed: Aug. 25, 2015

(65) Prior Publication Data

US 2017/0058686 A1 Mar. 2, 2017

(51) Int. Cl.
*F01D 11/00* (2006.01)
*F01D 9/04* (2006.01)
(Continued)

(52) U.S. Cl.
CPC ............ *F01D 11/003* (2013.01); *F01D 9/041* (2013.01); *F01D 11/005* (2013.01);
(Continued)

(58) Field of Classification Search
CPC ..... B05D 1/005; F01D 11/003; F01D 11/005; F01D 25/005; F01D 9/041;
(Continued)

(56) References Cited

U.S. PATENT DOCUMENTS 4,621,017 A 11/1986 Chandler et al.
5,350,447 A 9/1994 Copes
(Continued)

FOREIGN PATENT DOCUMENTS

DE 19814442 A1 10/1998
EP 1918549 A1 5/2008
(Continued)

OTHER PUBLICATIONS

Machine Translation and Notification of Reason for Refusal issued in connection with corresponding JP Application No. 2016-160926 dated Aug. 15, 2017.

(Continued)

*Primary Examiner* — Mark Laurenzi
*Assistant Examiner* — Paul Thiede
(74) *Attorney, Agent, or Firm* — GE Global Patent Operation; John P. Darling

(57) ABSTRACT

A coated seal slot system for turbomachinery includes a first turbine component comprising a first groove having at least one first coating attached to at least a portion of the first groove of the first turbine component, a second turbine component comprising a second groove having at least one second coating attached to at least a portion of the second groove of the second turbine component. The first and the second turbine components are disposable adjacent to each other with the first groove having the first coating and the second groove having the second coating together forming a coated seal slot extending across a gap between the first turbine component and the second turbine component. A seal is disposable in the coated seal slot and extendable across the gap between the first and the second turbine components and engageable with the first coating and the second coating to inhibit leakage of gas through the gap.

5 Claims, 7 Drawing Sheets

(51) Int. Cl.
  *F01D 25/00* (2006.01)
  *F16J 15/08* (2006.01)
  *B05D 1/00* (2006.01)
(52) U.S. Cl.
  CPC ........ *F01D 25/005* (2013.01); *F16J 15/0887* (2013.01); *B05D 1/005* (2013.01); *F05D 2230/90* (2013.01); *F05D 2240/11* (2013.01); *F05D 2240/80* (2013.01); *Y02T 50/672* (2013.01)
(58) Field of Classification Search
  CPC ............ F05D 2230/90; F05D 2240/11; F05D 2240/80; F16J 15/0887; Y02T 50/672
  USPC .......................................... 415/139, 134, 135
  See application file for complete search history.

(56) References Cited

U.S. PATENT DOCUMENTS

| | | | |
|---|---|---|---|
| 5,962,076 A | 10/1999 | Mason et al. | |
| 6,287,511 B1 | 9/2001 | Merrill et al. | |
| 7,874,059 B2 * | 1/2011 | Morrison | F16B 5/0266 29/446 |
| 8,021,758 B2 | 9/2011 | Sambasivan et al. | |
| 8,210,823 B2 | 7/2012 | Ward et al. | |
| 8,322,977 B2 | 12/2012 | Beeck | |
| 8,349,111 B2 | 1/2013 | Akash et al. | |
| 2009/0162674 A1 | 6/2009 | Boutwell et al. | |
| 2011/0027517 A1 | 2/2011 | Kirby et al. | |
| 2011/0027557 A1 | 2/2011 | Kirby et al. | |
| 2015/0004324 A1 | 1/2015 | Bouillon et al. | |

FOREIGN PATENT DOCUMENTS

| | | |
|---|---|---|
| EP | 2236650 A1 | 10/2010 |
| EP | 2287136 A2 | 2/2011 |
| EP | 3088680 A1 | 11/2016 |
| JP | 2008-002468 A | 1/2008 |
| JP | 2011-037701 A | 2/2011 |
| JP | 2015-522745 A | 8/2015 |
| WO | 2010027384 A1 | 3/2010 |

OTHER PUBLICATIONS

Vippola et al., "Aluminum Phosphate Sealed Alumina Coating: Characterization of Microstructure", Materials Science and Engineering: A, Science Direct, vol. 323, Issues 1-2, pp. 1-8, Jan. 31, 2002.

S Ahmaniemi et al., "Improved Sealing Treatments for Thick Thermal Barrier Coatings", Surface and Coatings Technology, Science Direct, vols. 151-152, pp. 412-417, Mar. 1, 2002.

S Roy et al., "AlPO4—C Composite Coating for High Emissivity and Oxidation Protection Applications", Surface Engineering, vol. 29, Issue 5, pp. 360-365, Jun. 2013.

European Search Report and Opinion issued in connection with corresponding EP Application No. 16185129.0 dated Dec. 21, 2016.

Sarawate et al., pending U.S. Appl. No. 14/695,288, filed Apr. 24, 2015, entitled "Seals With a Thermal Barrier for Turbomachinery".

Sevincer et al., pending U.S. Appl. No. 14/695,649, filed Apr. 24, 2015, entitled "Composite Seals for Turbomachinery".

Marin et al., pending U.S. Appl. No. 14/810,672, filed Jul. 28, 2015, entitled "Seals With a Conformable Coating for Turbomachinery".

\* cited by examiner

COATED SEAL SLOT SYSTEMS FOR TURBOMACHINERY AND METHODS FOR FORMING THE SAME

TECHNICAL FIELD

The present disclosure relates generally to turbomachinery having seal slots and seals for reducing leakage, and more particularly to turbomachinery having coated seal slot systems and methods for forming the same operable to reduce leakage between adjacent components of turbomachinery.

BACKGROUND

Leakage of hot combustion gases and/or cooling flows between turbomachinery components generally causes reduced power output and lower efficiency. For example, hot combustion gases may be contained within a turbine by providing pressurized compressor air around a hot gas path. Typically, leakage of high pressure cooling flows between adjacent turbine components (such as stator shrouds, nozzles, and diaphragms, inner shell casing components, and rotor components) into the hot gas path leads to reduced efficiency and requires an increase in burn temperature, and a decrease in engine gas turbine efficiency to maintain a desired power level as compared to an environment void of such leakage. Turbine efficiency thus can be improved by reducing or eliminating leakage between turbine components.

Traditionally, leakage between turbine component junctions is treated with metallic seals positioned in the seal slots formed between the turbine components, such as stator components. Seal slots typically extend across the junctions between components such that metallic seals positioned therein block or otherwise inhibit leakage through the junctions. However, preventing leakage between turbine component junctions with metallic seals positioned in the seal slots in the turbine components is complicated by the relatively high temperatures produced in modern turbomachinery. Due to the introduction of new materials, such as ceramic-matrix composite (CMC) turbine components, that allow turbines to operate at higher temperatures (e.g., over 1,500 degrees Celsius) relative to traditional turbines, conventional metallic turbine seals for use in seal slots may not be adequate.

Preventing leakage between turbine component junctions with metallic seals is further complicated by the fact that the seal slots of turbine components are formed by corresponding slot portions in adjacent components (a seal positioned therein thereby extending across a junction between components). Misalignment between these adjacent components, such as resulting from thermal expansion, manufacturing, assembly and/or installation limitations, etc., produces an irregular seal slot contact surface that may vary in configuration, shape and/or magnitude over time. Further, the seal slot contact surface may include surface irregularities or roughness, such as resulting from manufacturing limitations, thermal expansion, wear, etc., that allow air to migrate between the seal slot contact surface and the outer surface(s) of a seal positioned there against. The surface roughness of the seal slot contact surface may also vary overtime, such as resulting from thermal cyclic loading and/or wear.

Such irregularities in the seal slot contact surface allow for leakage across a seal positioned within the seal slot if the seal does not deform or otherwise conform to such irregularities. Unfortunately, many conventional metallic seals that attempt to account for such irregular seal slot contact surfaces (e.g., due to misalignment) do not adequately withstand current turbine operating temperatures. Further, many conventional metallic and non-metallic seals that do attempt to account for surface irregularities of the seal slot contact surfaces are not able to adapt to changes of the surface irregularities over time, as they typically plastically deform or detach to at least partially fill the surface irregularities.

There is a need for further turbomachinery having seal slots and seals for reducing leakage, and more particularly to turbomachinery having coated seal slot systems and methods for forming the same operable to reduce leakage between adjacent components of turbomachinery.

SUMMARY

In an aspect of the present disclosure, a coated seal slot system for turbomachinery includes a first turbine component comprising a first groove having at least one first coating attached to at least a portion of the first groove of the first turbine component, a second turbine component comprising a second groove having at least one second coating attached to at least a portion of the second groove of the second turbine component. The first and the second turbine components disposable adjacent to each other with the first groove having the first coating and the second groove having the second coating together forming a coated seal slot extending across a gap between the first turbine component and the second turbine component. A seal is disposed in the coated seal slot and extends across the gap between the first and the second turbine components and engageable with the first coating and the second coating to inhibit leakage of gas through the gap.

In another aspect of the present disclosure, a method for forming a coated seal slot for turbomachinery. The method includes providing a first turbine component having a first groove, providing a second turbine component having a second groove, providing at least one first coating on at least a portion of the first groove of the first turbine component, and providing at least one second coating on at least a portion of the second groove of the second turbine component. The first groove having the first coating and the second groove having the second coating together form a coated seal slot extending across a gap formed between the first turbine component and the second turbine component, and a seal being disposable in the coated seal slot and engageable with the first coating and the second coating to inhibit leakage of gas through the gap.

These and other objects, features and advantages of this disclosure will become apparent from the following detailed description of the various aspects of the disclosure taken in conjunction with the accompanying drawings.

DRAWINGS

The foregoing and other features, aspects and advantages of this disclosure will become apparent from the following detailed description of the various aspects of the disclosure taken in conjunction with the accompanying drawings, wherein.

DETAILED DESCRIPTION

Figure 1:
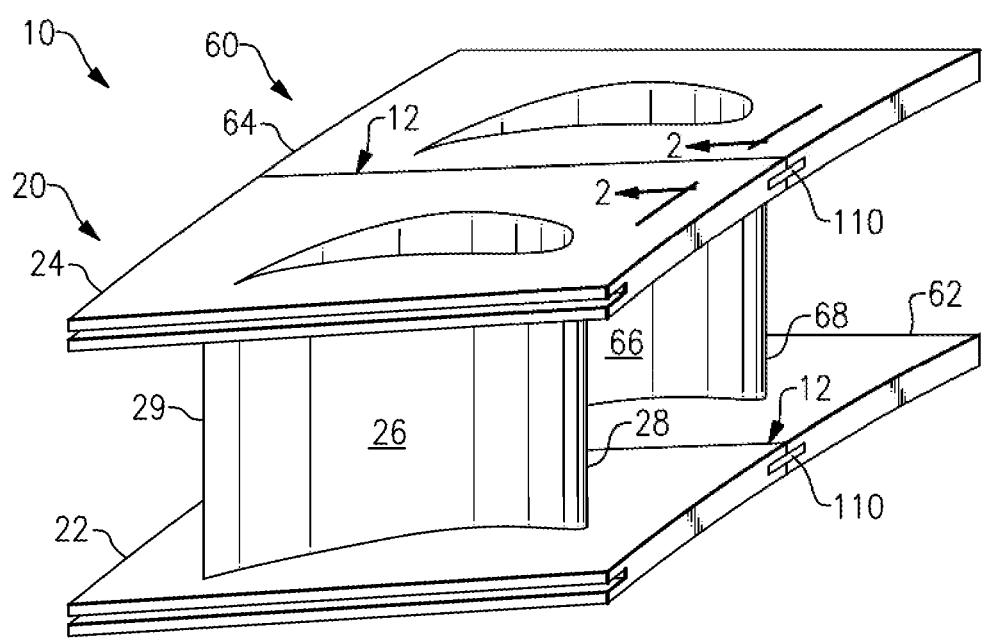
FIG. 1 is a perspective view of a plurality of turbine components having coated seal slot systems in accordance with aspects of the present disclosure.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present disclosure addresses and enhances, inter alia, inhibiting leakage of gases across a gap between portions in a turbine engine such as for use in components of gas turbines, including aircraft gas turbine engines and land-based gas turbine engines used in the power-generating industry. The technique of the present disclosure may be applied to turbine components having a seal slot for receiving a seal, and includes at least a portion of the seal slot having a coating attached to one side of the seal slot and coating attached to the other side of the seal slot for improving sealing with a seal disposed across the gap. The coating may reduce the leakage of gases due to surface irregularities in the turbine components forming the seal slot and/or the surface irregularities in the seal. For example, the coating may provide a generally smooth surface for engaging spaced apart portions of the seal. Turbomachinery seal slots having a coating configured for use with seals and methods for manufacturing the same in accordance with aspects of the present disclosure may withstand the relatively high operating temperatures of turbines including CMC components. Further, selection of the coating material may inhibit chemical interaction and/or inhibit thermal interaction of metallic components of the seals with the hot gas flow/leakage and/or the seal slot itself.

FIG. 1 illustrates one embodiment of a coated seal slot system 10 for turbomachinery in accordance with aspects of present disclosure. Coated seal slot system 10 may include a first turbine component 20 and a second turbine component 60 such as vanes and a seal 110 disposed between the adjacent turbine components. For example, first turbine component 20 may include a first platform or root portion 22, a second platform or tip portion 24, and an airfoil 26 extending therebetween defining a leading edge 28 and a trailing edge 29. Second turbine component 60 may include a first platform or root portion 62, a second platform or tip portion 64, and an airfoil 66 extending therebetween defining a leading edge 68 and a trailing edge (not shown in FIG. 1. Seals 110 may extend across gaps 12 formed between first and second turbine components 20 and 60 to inhibit leakage of gas through the gaps. For example, a first seal may extend across the gap between adjacent first platforms of the first and second turbine components, and a second seal may extend across the gap between adjacent second platforms of the first and second turbine components. While reference is made to coated seal slot system 10 having seals disposed between the root portions and the tip portions of the first and second turbine components, in other embodiments a coated seal slot system may need only be disposed between the root portions or the tip portion of the first and second turbine components.

Figure 2:
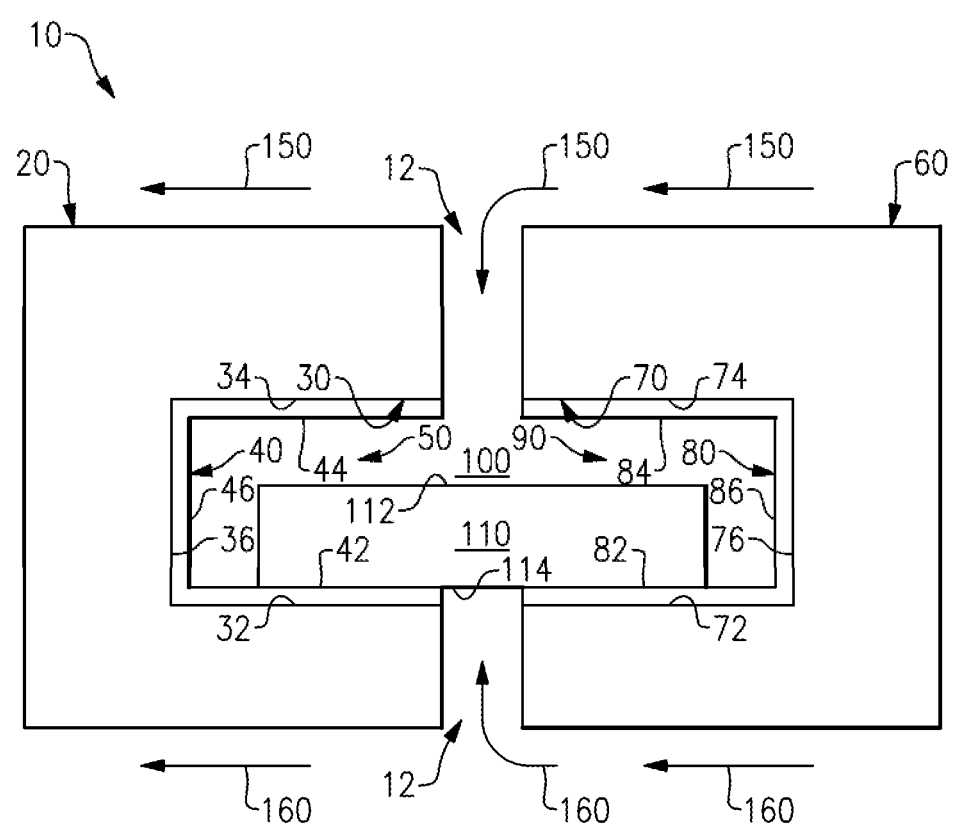
FIG. 2 is an enlarged cross-sectional view taken along line 2-2 of FIG. 1 illustrating a portion of the coated seal slot system in which a coating is formed by a spin coating process.

As best shown in FIG. 2, coated seal slot system 10 may include first turbine component 20 and second turbine component 60 spaced from one another such that a junction, pathway, or gap 12 extends between the first and second adjacent turbine components. In this embodiment, first turbine component 20 may include a first seal groove 30 that opens onto gap 12. Second turbine component 60 may include a second seal groove 70 that opens onto gap 12. For example, first seal groove 30 may include a first surface 32, a spaced apart second surface 34, and a connecting surface 36 extending between the first surface and the second surface. Second groove 70 may include a first surface 72, a spaced apart second surface 74, and a connecting surface 76 extending between the first surface and the second surface.

In one aspect of the present disclosure, first turbine component 20 and the second turbine component 60 may be formed from ceramic matrix composite (CMC) materials that generally comprise a ceramic fiber reinforcement material embedded in a ceramic matrix material. The reinforcement material may be discontinuous short fibers that are randomly dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, allow high-temperature applications due to their high temperature capabilities. SiC fibers have also been used as a reinforcement material for a variety of other ceramic matrix materials, including TiC, $Si_3N_4$, and $Al_2O_3$. Various techniques may be employed in the fabrication of CMCs, including chemical vapor infiltration (CVI), wet drum winding, lay-up, lamination, pyrolysis, and melt infiltration (MI). It will be appreciated that in other embodiments of the present disclosure, the turbine components may be generally formed from any suitable material such as a metal alloy, an intermetallic material, and combinations thereof.

With reference again to FIG. 2, turbine component 20 may comprise a CMC material and first groove 30 may be created by an electrical discharge machining (EDM) process. Turbine component 60 may comprise a CMC material and second groove 70 may be created by an electrical discharge machining (EDM) process. The resultant EDMed surfaces of the grooves may have a surface roughness of greater than about 40 micro inches, greater than about 150 microinches, greater than about 250 microinches, or greater than about 340 microinches.

As described below in greater detail, reducing the leakage across the gap may be made by reducing the surface roughness of the grooves or substantially reducing the surface roughness on which a seal rests or rides on by application of a layer or coating applied to the grooves which form a smoother surface on which a seal rests or rides. First turbine component 20 may include at least one first layer or coating 40 secured, coupled, chemically bonded, mechanically bonded, or otherwise attached to first groove 30. For example, first coating 40 may include a first coating portion 42 attached to first surface 32, a second coating portion 44 attached to second surface 34, and a connecting coating portion 46 attached to connecting surface 36 of first groove 30. Second turbine component 60 may include at least one second layer or coating 80 secured, coupled, chemically bonded, mechanically bonded, or otherwise attached to second groove 70. For example, second coating 80 may include a second coating portion 82 attached to first surface 72, a second coating portion 84 attached to second surface 74, and a connecting coating portion 86 attached to connecting surface 86 of second groove 70.

Coating 40 and 80 may include any suitable coating such as a coating that may provide a dense, smooth coating. The coating may have a thermal expansion matched to the turbine component material forming the groove. For example, difference between the coefficient of thermal expansion of the coating and the coefficient of thermal expansion of the portion of the turbine component forming the groove may be less than a magnitude that is effective to decouple the coating from the surfaces of the groove due to cyclic thermal loading during use of the turbomachinery. In some embodiments, the coating may have a coefficient of thermal expansion that is within or less than about 25 percent of the coefficient of thermal expansion of the portion of the turbine components forming the grooves.

In some embodiments, the coating may be ceramic coatings, glass coatings, glass bonded ceramics, glaze coatings, enamel based coatings, SiC filled alumina phosphate, aluminosilicate glasses, a rare earth containing material such as rare earth disilicates and rare earth monosilicates, alkali/alkali earth alumino boro phosphor silicate glasses and fillers, alkaline earth fluorides, other suitable coatings, and combinations thereof. In addition, in other embodiments the coatings may include materials operable for promoting adhesion of the coating to the portions of the turbine component forming the groove. For example, glass coatings may include metal oxides such as at least one of iron oxide, nickel oxide, cobalt oxide, chromium oxide, copper oxide, vanadium oxide, zinc oxide, antimony oxide, and/or other adhesion promoters. The coatings may include the required high temperature melt and flow properties to provide optimum stability and compliance at the operating conditions of the turbine component.

In another embodiments, the coating may be a plurality of coating layers. For example, the coating may include a bond coat disposed on the surface of the groove, an intermediate layer disposed on the bond coat, a sealing layer disposed on intermediate layer, a first top coat disposed on sealing layer, a second top coat disposed on first top coat, and an outer layer disposed on the second top coat.

The bond coat may contain silicon or silicon oxide. The intermediate layer may be made of a barrier material that is substantially inert with respect to silicon oxide to promote chemical stability in the coating system. "Substantially inert" means that there is at most only incidental interaction (solubility or reactivity) between silica and the barrier material. Rare-earth disilicates, such as disilicates of yttrium, ytterbium, lutetium, scandium, and other rare-earth elements, are non-limiting examples of suitable barrier materials. The sealing layer may be an alkaline-earth aluminosilicate. The top coat material may be a ceramic material which include, but are not limited to, silicates, aluminosilicates, and yttria-stabilized zirconia. In some embodiments, the top coat may contain a rare earth monosilicate and/or rare earth disilicate. For example, a plurality of top coats may be a dual-layer coating, with an inner layer or first top coat of rare earth disilicate, and a second top coat of rare earth monosilicate. The rare earth elements associated with these monosilicate and disilicate materials, in some embodiments, may include one or more of yttrium, ytterbium, lutetium, and scandium. A particular example is where the second top coat layer is yttrium monosilicate and the inner layer is a rare earth disilicate (such as yttrium disilicate, for instance). The outer layer may include stabilized zirconia, rare earth silicates, or other suitable materials.

The coating is applied on to the machined EDMed surfaces of the grooves to provide a coating surface with reduced roughness or substantially less roughness compared to the roughness of EDMed surfaces of the grooves. In some embodiments, the coating surface roughness may be less that about 340 microinches, less that about 250 microinches, less that about 150 microinches, less than about 40 microinches, which may reduce or substantially reduce the leakage of the system. From the present description, it will be appreciated that the required thickness of the coating may be just enough to smoothen the groove surface to within a desired Ra or Sa requirements for leak prevention.

For example, the coating material may be mixed with solvents, binder systems, dispersants, and/or fillers, to form a fluid slurry that is capable of flowing with or without force. The slurry suspension may be applied within the grooves, for example, completely covering the surfaces of the grooves with the slurry generally filling in the irregularities in the surface of the grooves of the first and second turbine components. Excess slurry may be removed by spinning the part using a high speed centrifuge/spin coater, leaving behind a thin deposited slurry layer having a thickness of about 0.0005 inch to about 0.015 inch or greater, and may include a thickness of about 0.0005 inch, 0.001 inch, or other suitable thickness. Forces such as G forces or centrifugal can be applied to the component by a simple centrifuge device, or one a more sophisticated planetary centrifugal mixer may be employed. The first and second turbine components and the deposited slurry layer may be heated together to a temperature where the remaining thin slurry layer can then be melted or sintered (e.g., without melting) to obtain a final integrity of the coating having a thickness of about 0.0005 inch to about 0.015 inch or greater, and may include a thickness of about 0.0005 inch, 0.001 inch, or other suitable thickness.

With reference still to FIG. 2 and with first and second turbine components 20 and 60 disposed adjacent to each other, first groove 30 and first coating 40 of first turbine component 20 defines a first slot 50. Second groove 70 and second coating 80 of second turbine component 60 defines a second slot 90. First slot 50 and second slot 90 may jointly together form a coated seal slot 100 extending across gap 12 between first and second turbine components 20 and 60.

Seal 110 is disposed in coated seal slot 100 and engageable with first coating 40 and second coating 80 to inhibit leakage of gas through gap 12. For example, seal 110 may fit into coated seal slot 100 and span across gap 12. Suitable materials and configurations of the seal is further described in greater detail below.

First and the second turbine components 20 and 60 may be positioned between a first airflow 150, such as a cooling airflow, and a second airflow 160, such as hot combustion airflow. It is noted that the term "airflow" is used herein to describe the movement of any material or composition, or combination of materials or compositions. The first and second airflows 150 and 160 may interact along gap 12 such that the first airflow 150 is a "driving" airflow that acts against a seal surface 112 of seal 110 to force a seal surface 114 against first coating 42 of first turbine component 20 and against second coating 82 of second turbine component 60.

For example, coated seal slot system 10 is operable to seal gap 12 to inhibit the cooling airflow from passing through gap 12. Coated seal slot system 10 also prevents the hot combustion airflow from passing through gap 12. For example, the portion of the turbine component, the coating, and the seal may be substantially impervious or substantially non-porous to liquids, gases, and/or solids at pressures experienced in turbomachinery to provide a reduced leakage across the gap compared to the gap not having the coated seal slot system.

Figure 3:
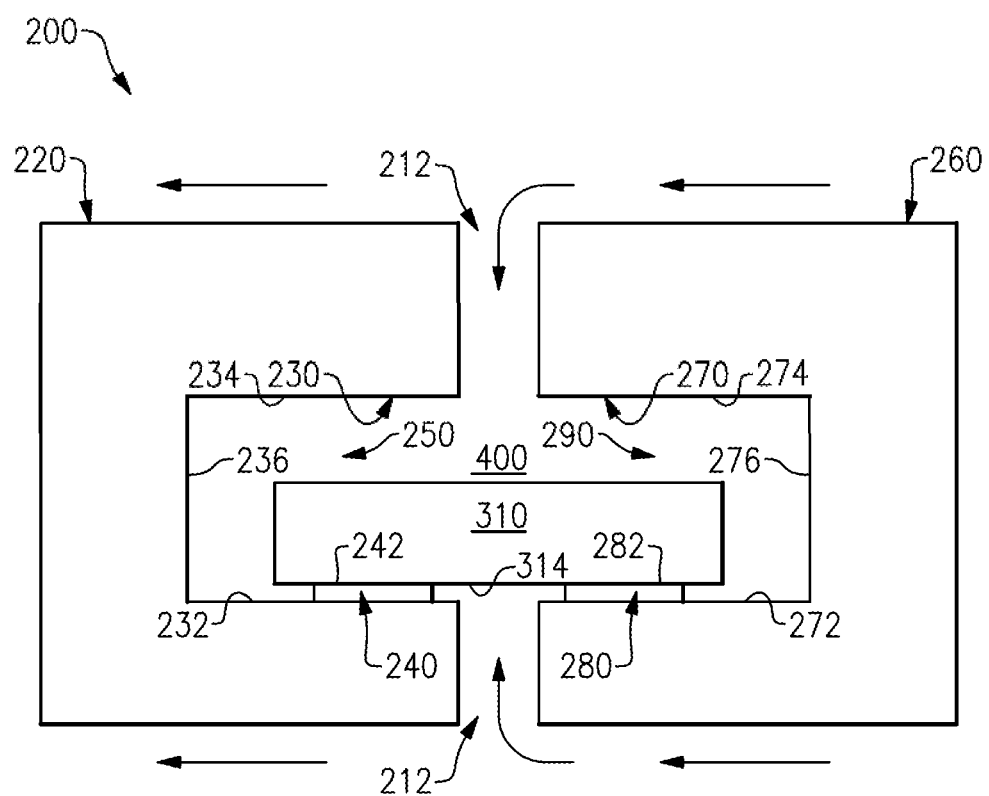
FIG. 3 is a cross-sectional view of another embodiment of a coated seal slot system in accordance with aspects of the present disclosure in which a coating is formed by a tape casting and application process.

FIG. 3 illustrates another embodiment of a coated seal slot system 200 for turbomachinery in accordance with aspects of present disclosure in which a layer or coating is formed by a tape casting and application process. In this illustrated embodiment, coated seal slot system 200 may be essentially the same as coated seal slot system 10 (FIGS. 1 and 2) with the exceptions as noted below. Coated seal slot system 200 may include a first turbine component 220 and a second turbine component 260 and a seal 310 disposed between the adjacent turbine components. The turbine components may be formed form any suitable material such as those described above. Seal 310 may extend across a gap 212 formed between first and second turbine components 220 and 260 to inhibit leakage of gas through the gap.

First turbine component 220 may include a first seal groove 230 that opens onto gap 212. Second turbine component 260 may include a second seal groove 270 that opens onto gap 212. For example, first seal groove 230 may include a first surface 232, a spaced apart second surface 234, and a connecting surface 236 extending between the first surface and the second surface. Second groove 270 may include a first surface 272, a spaced apart second surface 274, and a connecting surface 276 extending between the first surface and the second surface. First turbine component 220 may include at least one first layer or coating 240 secured, coupled, chemically bonded, mechanically bonded, or otherwise attached to first surface 232 of first groove 230. Second turbine component 260 may include at least one second layer or coating 280 secured, coupled, chemically bonded, mechanically bonded, or otherwise attached to second surface 272 of groove 270.

Coating 240 and 280 may be formed from a tape casting and applied to result in any suitable coating such as a coating that may provide a dense, smooth coating. The coating may have a thermal expansion matched to the turbine component material forming the groove. For example, difference between the coefficient of thermal expansion of the coating and the coefficient of thermal expansion of the portion of the turbine component forming the groove may be less than a magnitude that is effective to decouple the coating from the surfaces of the groove due to cyclic thermal loading during use of the turbomachinery. In some embodiments, the coating may have a coefficient of thermal expansion that is within or less than about 25 percent of the coefficient of thermal expansion of the portion of the turbine components forming the grooves.

In some embodiments, the resulting coatings formed from application of the tapes may be ceramic coatings, glass coatings, glass bonded ceramics, glaze coatings, enamel based coatings, SiC filled alumina phosphate, aluminosilicate glasses, a rare earth material such as rare earth disilicates and rare earth monosilicates, alkali/alkali earth alumino boro phosphor silicate glasses and fillers, alkali fluorides, fluorophosphates, silicate apatities, other suitable coatings, and combinations thereof.

In addition, in other embodiments, the tape may be casted and applied to result in coatings that may include materials operable for promoting adhesion of the coating to the portions of the turbine component forming the groove. For example, glass coating may include metal oxides such as at least one of iron oxide, chromium oxide, copper oxide, vanadium oxide, zinc oxide, antimony oxide, and/or other adhesion promoters. The coatings may include the required high temperature melt and flow properties to provide optimum stability and compliance at the operating conditions of the turbine component.

In another embodiments, the tape may be casted and applied to result in a coating having a plurality of coating layers. For example, the coating may include a bond coat disposed on the surface of the groove, an intermediate layer disposed on the bond coat, a sealing layer disposed on intermediate layer, a first top coat disposed on sealing layer, a second top coat disposed on first top coat, and an outer layer disposed on the second top coat.

The bond coat may contain silicon or silicon oxide. The intermediate layer may be made of a barrier material that is substantially inert with respect to silicon oxide to promote chemical stability in the coating system. "Substantially inert" means that there is at most only incidental interaction (solubility or reactivity) between silica and the barrier material. Rare-earth disilicates, such as disilicates of yttrium, ytterbium, lutetium, scandium, and other rare-earth elements, are non-limiting examples of suitable barrier materials. The sealing layer may be an alkaline-earth aluminosilicate. The top coat material may be a ceramic material which include, but are not limited to, silicates, aluminosilicates, and yttria-stabilized zirconia. In some embodiments, the top coat may contain a rare earth monosilicate and/or rare earth disilicate. For example, a plurality of top coats may be a dual-layer coating, with an inner layer or first top coat of rare earth disilicate, and a second top coat of rare earth monosilicate. The rare earth elements associated with these monosilicate and disilicate materials, in some embodiments, may include one or more of yttrium, ytterbium, lutetium, and scandium. A particular example is where the second top coat is yttrium monosilicate and the inner layer is a rare earth disilicate (such as yttrium disilicate, for instance). The outer layer may include stabilized zirconia, rare earth silicates, or other suitable materials.

For example, a thin flexible sheet or tape may be created from the slurry mixture. The slurry mixture may be spread evenly by using a doctor blade assembly to obtain a set uniform wet layer that eventually dries into a flexible tape. The evenly spread deposited slurry may have a thickness of about 0.0005 inch to about 0.015 inch or greater, and may include a thickness of about 0.0005 inch, 0.001 inch, or other suitable thickness. The dried flexible tape can then be cut and/or formed into the desired size or shape and then applied onto the desired surface such as a portion of the grooves of the first and second turbine components. For example, the dried flexible tape may have a thickness of about 0.0005 inch to about 0.015 inch or greater, such as a thickness of about 0.0005 inch, 0.001 inch, or other suitable thickness. A suitable adhesive may be applied to one side of the tape. The adhesive may hold the tape in position in the grooves. The first and second turbine components and the tape materials may be heated together to a temperature where the material experiences some viscous flow to generally fill the irregularities in the desired surface such as a portion of the grooves of the first and second turbine components. During the heating process the adhesive may burn away. Upon cooling, the coating may be a uniform coating having a resultant surface with an improved surface finish. The coating may also be matched to the thermal expansion to the grooves in the first and second turbine components. The coating may have a thickness of about 0.0005 inch to about 0.015 inch or greater such as about 0.0005 inch, 0.001 inch, or other suitable thickness. The resulting surface of the coating formed by the tape, e.g., the surface that engages the seal, has a reduced roughness or substantially less roughness compared to the roughness of the surfaces of the grooves. As described above, it will be appreciated that the required thickness of the coating may be just enough to smoothen the groove surface to within a desired Ra or Sa requirements for leak prevention. In some embodiments, the coating surface roughness formed by the tape may be less that about 340 microinches, less that about 250 microinches, less that about 150 microinches, less than about 40 microinches, which may reduce or substantially reduce the leakage of the system.

With reference still to FIG. 3 and with first and second turbine components 220 and 260 disposed adjacent to each other, first groove 230 and first coating 240 of first turbine component 220 defines a first slot 250. Second groove 270 and second coating 280 of second turbine component 260 defines a second slot 290. First slot 250 and second slot 290 may jointly together form a coated seal slot 400 extending across gap 212 between first and second turbine components 220 and 260.

Seal 310 is disposed in seal slot 400 and engageable with first coating 240 and second coating 280 to inhibit leakage of gas through gap 212. For example, seal 310 may fit into seal slot 400 and span across gap 212. A seal surface 314 may be forced against a surface 242 of coating 240 of first turbine component 220 and forced against a surface 282 of coating 280 of second turbine component 260. For example, coated seal slot system 200 is operable to seal gap 212 to inhibit the cooling airflow from passing through gap 212. Coated seal slot system 200 also prevents the hot combustion airflow from passing through gap 212.

Figure 4:
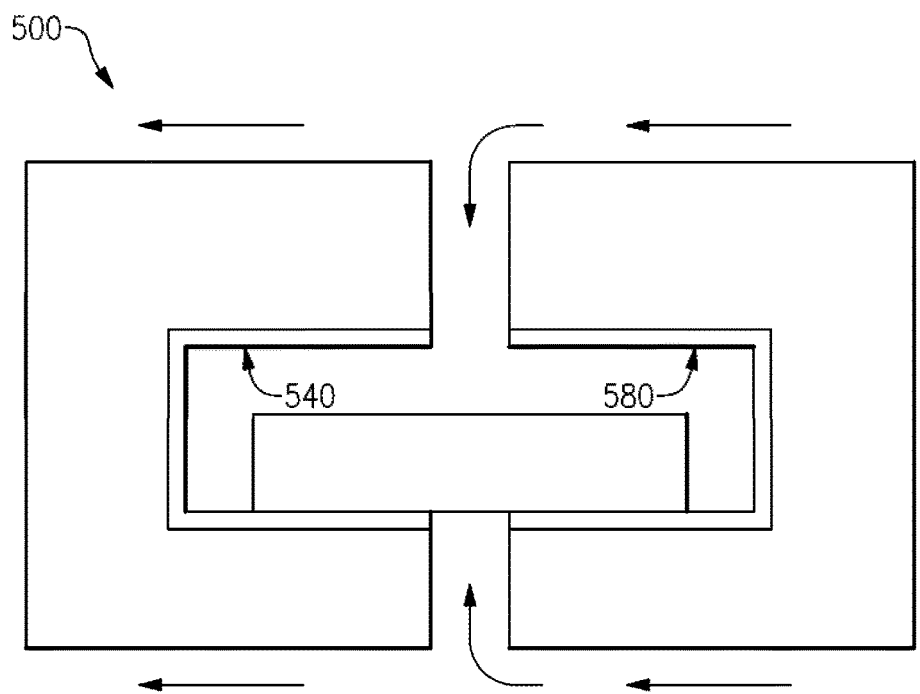
FIG. 4 is a cross-sectional view of another embodiment of a coated seal slot system in accordance with aspects of the present disclosure in which a coating is formed by a bulk filling and a machining process.

FIG. 4 is a cross-sectional view of another embodiment of a coated seal slot system 500 in accordance with aspects of the present disclosure in which the coatings are formed by a bulk filling and machining process. For example, a slurry material such as the slurry materials noted above may be deposed in the groove, e.g., generally completely filling the groove. The slurry is then dried and then heated and/or sintered. Thereafter, the slurry is machined such as by an electrical discharge machining (EDM) process resulting in the finished coatings 540 and 580 having a smoother surface finish compared to the surface finish of the groove. For example, since the slurry is a generally homogenous material, the electrical discharge machining (EDM) process will provide a smoother surface finish on the cured slurry compared the electrical discharge machining (EDM) process used to formed groove in a turbine component such as a CMC turbine component having ceramic fibers embedded in a ceramic matrix. While the coatings are illustrated in FIG. 4 as having a constant thickness, it will be appreciated that the thicknesses of the coating against the three sides forming the groove may be different.

Other possible processes for forming the coated seal slot in accordance with aspects of the present may include machining the coating or material for forming the coating in the groove using lasers, milling, wire saw grooving, semiconductor dicing sawing, or other suitable processes.

Figure 5:
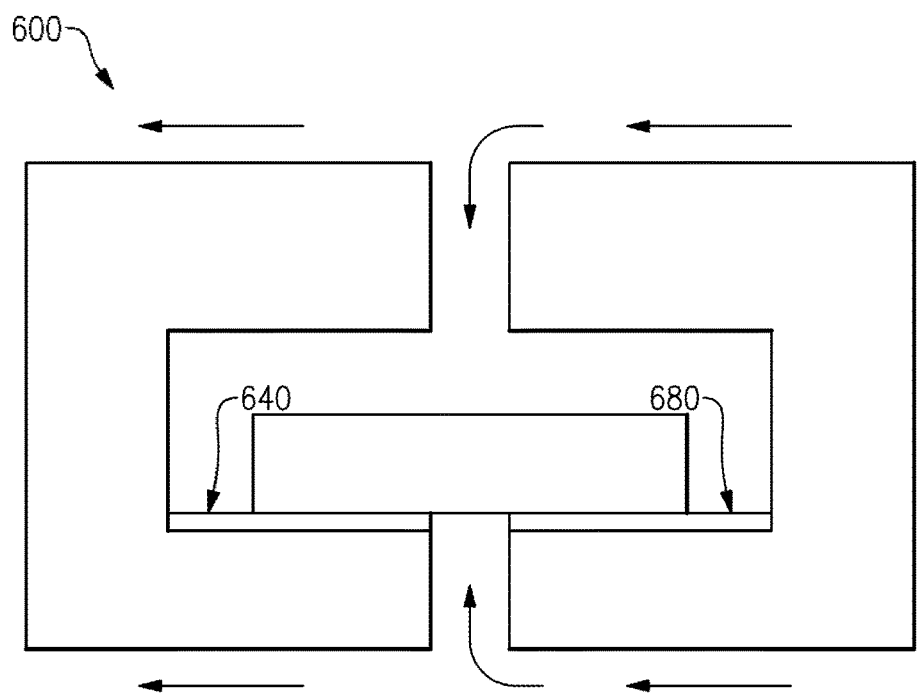
FIG. 5 is a cross-sectional view of another embodiment of a coated seal slot system in accordance with aspects of the present disclosure in which a coating is formed by a scraping process.

FIG. 5 is a cross-sectional view of another embodiment of a coated seal slot system 600 in accordance with aspects of the present disclosure in which the coating is formed by a scraping process. For example, a slurry material such as the slurry materials noted above may be deposed in the grooves, e.g., completely filling the grooves. A tool (not shown in FIG. 5) may be sized to be received in the groove. During a scraping process, the tool may rest along two of the surfaces of the groove and provide a suitable spacing from the third surface of the groove on which is to be formed the coating. The tool may be moved along the length of the groove to scrape the slurry from the desired surfaces and leaving a thin slurry coating on the desired portions of the groove surface. Thereafter, the remaining thin slurry layer can then be dried and then heated and/or sintered to form the final integrity of coatings 640 and 680.

Figure 6:
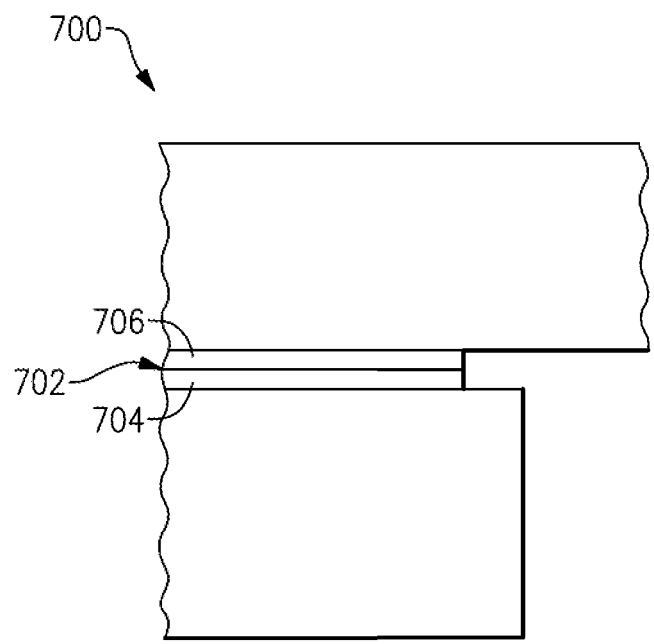
FIG. 6 is a cross-sectional view of another embodiment of a coated seal slot system in accordance with aspects of the present disclosure in which a coating is formed having a plurality of coating layers.

FIG. 6 is a cross-sectional view of another embodiment of a portion of a coated seal slot system 700 in accordance with aspects of the present disclosure in which a coating 702 is formed having a plurality of coating layers. For example, coating 702 may include at least a first coating layer 704 and a second coating layer 706 that may be formed by one of more of the coating processes noted above. The first coating layer may be chemically bonded, mechanically bonded, attached, coupled or otherwise secured to the surface of the groove, and second coating layer may be chemically bonded, mechanically bonded, attached, coupled or otherwise secured to the surface of the first coating layer. The plurality of layers may include different materials. For example, first coating layer 704 may be a bond coat, and second coating layer 706 may be a protective coating. For example, the first coating layer may be formed by a chemical vapor deposition (CVD) process, and the second layer may be a spin coating layer disposed on top of the CVD coating layer. In one embodiment, the first layer may be a bond coat, and a second layer may include a top coat. As described above, in other embodiments, a coated seal slot system may include coatings that have more than two layers.

Figure 7:
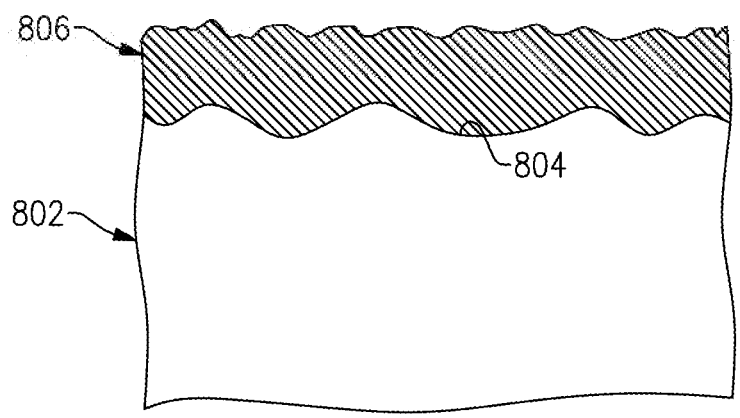
FIG. 7 is a cross-sectional view of another embodiment of a coated seal slot system in accordance with aspects of the present disclosure.

FIG. 7 is a cross-sectional view of another embodiment of a portion of a coated seal slot in accordance with aspects of the present disclosure illustrating the interface between a surface 804 of a groove in a turbine component 802 and a coating 806. The surface irregularities of the grooves in the turbine components may be due to manufacturing limitations, and/or may change over time due to thermal loading and wear. For example, the groove surfaces of CMC turbine components formed via an electric discharge machining process may include a surface roughness of greater than about 40 microinches, greater than about 150 microinches, greater than about 250 microinches, or greater than about 340 microinches. The coating may be configured and applied to the grooves of the turbine components such that it is secured, coupled, chemically bonded, mechanically bonded, or otherwise attached directly to the groove surfaces of the turbine components, and may substantially fill in pores or voids of surface and extend above the peaks of the groove. In such an embodiment, the coated surface has a reduced roughness compared to the roughness of the grooved surface.

Figure 8:
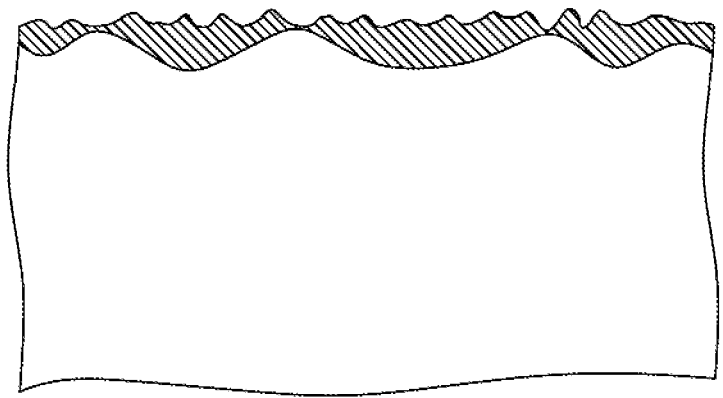
FIG. 8 is a cross-sectional view of another embodiment of a coated seal slot system in accordance with aspects of the present disclosure.

FIG. 8 is a cross-sectional view of another embodiment of a portion of a coated seal slot in accordance with aspects of the present disclosure illustrating the interface between a surface of a groove in a turbine component and a coating. In this illustrated embodiment, the coating may be configured and applied to the grooves of the turbine components such that it is secured, coupled, chemically bonded, mechanically bonded, or otherwise attached directly to the groove surface of the turbine components, and may generally fill in portions of the pores or voids of the surface between the peaks of the grooves with the peaks of the grooves forming lower portions of the valleys of the coated surface. In such an embodiment, the coated surface has a reduced roughness compared to the roughness of the grooved surface.

Figure 9:
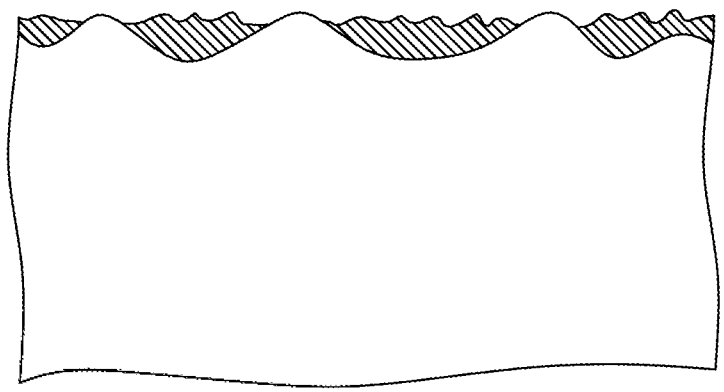
FIG. 9 is a cross-sectional view of another embodiment of a coated seal slot system in accordance with aspects of the present disclosure.

FIG. 9 is a cross-sectional view of another embodiment of a portion of a coated seal slot in accordance with aspects of the present disclosure illustrating the interface between a surface of a groove in a turbine component and a coating. In this illustrated embodiment, the coating may be configured and applied to the grooves of the turbine components such that it is secured, coupled, chemically bonded, mechanically bonded, or otherwise attached directly to the groove surface of the turbine components, and may fill in portions of the pores or voids of surface between the peaks of the grooves with the peaks of the grooves forming peaks of the coated surface. In such an embodiment, the coated surface has a reduced roughness compared to the roughness of the grooved surface.

From the present description, it will be appreciated that the coated seal slot may have any size, shape, or configuration capable of accepting a seal therein. For example, as shown in the illustrated exemplary embodiments in FIGS. 2 and 3, the first and second slots may be substantially similar to one another and positioned in a substantially aligned or in a mirrored or symmetric relationship to define together a seal slot or cavity that extends from within the first turbine component, across the gap, and into the second turbine component. However, due to manufacturing and assembly limitations and/or variations, as well as thermal expansion, movement and the like during use, the first and second slots may be skewed, twisted, angled or otherwise misaligned. In addition, the relative positioning of the first and second slots may change such as from use, wear or operating conditions. The term "misaligned" is used herein to encompass any scenario wherein slots have changed relative positions or orientations as compared to a nominal or initial position or configuration. The seal may be sufficiently flexible to account for the misalignment and maintain sealing contact with the coatings in the first and second coated grooves to effectively cut off or eliminate the gap extending between the first and second turbine components to thereby reduce or prevent the first and second airflows from interacting.

In the various embodiments of the coated seal slot system, the seal may be a metal, metal alloy, or a high temperature or metal alloy or super alloy or other suitable material or combination of material. The seal may be a substantially elongated solid plate-like member or have any other suitable configuration. For example, the seal may be made from a stainless steel or a nickel based alloy, such as nickel molybdenum chromium alloy, Haynes 214 or Haynes 214 with an aluminum oxide coating. In some embodiments, the seal may be made of a metal with a melting temperature of at least 1,500 degrees Fahrenheit, or potentially at least 1,800 degrees Fahrenheit. In some embodiments, the seal may be made of a metal with a melting temperature of at least 2,200 degrees Fahrenheit.

The seal may be preferably sufficiently flexible, but yet sufficiently stiff, to maintain sealing engagement with the sealing surface of the coating due to the forces acting on the seal while resisting being "folded" or otherwise "pushed" into the gap. The thickness of the seal may be less than the thickness or openings of the first and second seal slots. In some embodiments, the thickness of the seal may be within the range of about 0.01 inch to about 0.25 inch, or within the range of about 0.05 inch to about 0.1 inch. The width of the seal may be less than the width of the seal slot formed by the first and second grooves and coatings of the first and second turbine components, and the gap between the turbine components when the turbine components are assembled adjacent to one another. In some embodiments, the width of the seal may be within the range of about 0.125 inch to about 0.75 inch. As illustrated in the figures, the mattingly engaging sealing surfaces of the coatings and the seal may be substantially smooth and planar to substantially abut each other. In other embodiments, the shape and configuration of the sealing surfaces of the coating and the seal may be shaped or configured differently than that of the corresponding surfaces of the first and second grooves of the turbine components. In addition, the seal may be formed from a plurality of different materials, or include a coating on the outer surfaces of the seal. Such coating on the seals may be formed by any suitable method such as those described above for forming a coating on the grooves of the turbine components. In addition, a coating on the seals may be a slurry in aqueous or non-aqueous solvents with or without other additives, such as surfactants, dispersants, wetting agents, organic binders and/or electrolyte salts. The coatings on the seal may be applied using any technique, such as sparing, dip coating, wash coating, etc. In some embodiments, the coating may be formed on the metallic seal by wet coating and subsequent heat treatment (after drying of the coating) to densify and form an impervious layer on the seal that prevents metal oxidation of the metallic seal at operating conditions of turbine seal slots.

Coated seal slot systems in accordance with technique of the present disclosure may aid in reducing silicide formation, oxidation, thermal creep and/or increased wear concerns when applied to high temperature turbomachinery.

In addition, while two turbine components in the form of vanes are illustrated in FIG. 1, it will be appreciated that the turbine components incorporating the seal slot system may form a portion of turbomachinery such as stator shrouds, nozzles, and diaphragms, inner shell casing components, and rotor components. For example, a plurality of turbine components incorporating the coated seal slot system may be circumferentially arranged, and disposed in adjacent ones of the turbine components having one or more seal slot systems in accordance with aspects of the present disclosure. Further, the first and second components may be any other adjacent turbomachinery components, such as stationary or translating and/or rotating or moving turbine components.

Figure 10:
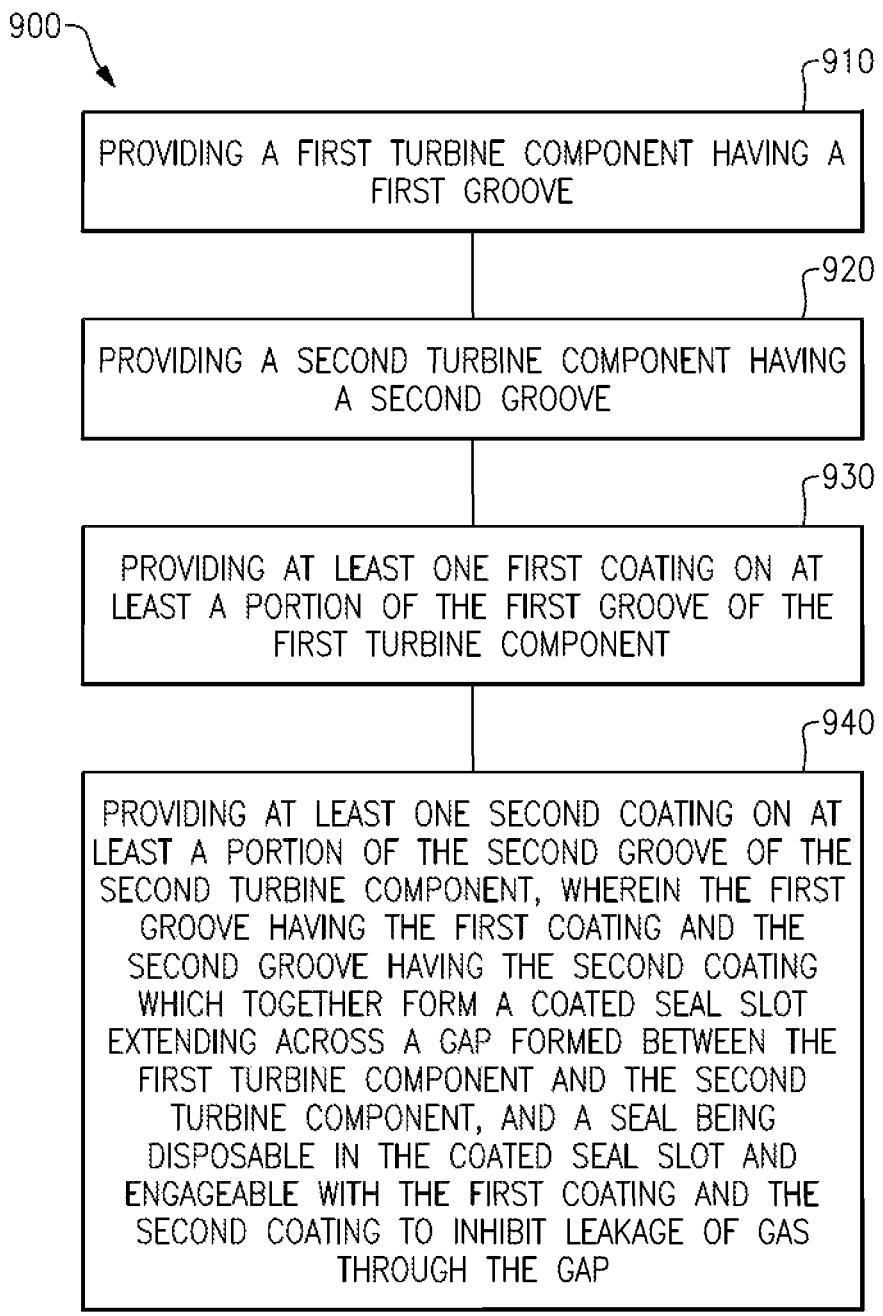
FIG. 10 is a flowchart of one embodiment of a method for forming a coated seal slot system for turbomachinery in accordance with aspects of the present disclosure.

FIG. 10 is a flowchart of one embodiment of a method 900 for forming a coated seal slot system for turbomachinery in accordance with aspects of the present disclosure. Method 900 includes at 910, providing a first turbine component having a first groove, and at 920, providing a second turbine component having a second groove. At 930, at least one first coating is provided on at least a portion of the first groove of the first turbine component, and at 940, at least one second coating is provided on at least a portion of the second groove of the second turbine component. The first groove having the first coating and the second groove having the second coating which together form a coated seal slot extending across a gap formed between the first turbine component and the second turbine component, and a seal being disposable in the coated seal slot and engageable with the first coating and the second coating to inhibit leakage of gas through the gap.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for forming a coated seal slot for turbomachinery, the method comprising:
   providing a first turbine component having a first groove;
   providing a second turbine component having a second groove;
   providing at least one first coating on at least a portion of the first groove of the first turbine component;
   providing at least one second coating on at least a portion of the second groove of the second turbine component; and
   wherein the first groove having the first coating and the second groove having the second coating which together form a coated seal slot extending across a gap formed between the first turbine component and the second turbine component, and a seal being disposable in the coated seal slot and engageable with the first coating and the second coating to inhibit leakage of gas through the gap, wherein the providing the first coating comprises applying a slurry onto the at least the portion of the first groove of the first turbine component and heat treating the slurry on the at least the portion of the first groove of the first turbine component, and the providing the second coating comprises applying a slurry onto the at least the portion of the second groove of the second turbine component and heat treating the slurry on the at least the portion of the second groove of the second turbine component.

2. A method for forming a coated seal slot for turbomachinery, the method comprising:
providing a first turbine component having a first groove;
providing a second turbine component having a second groove;
providing at least one first coating on at least a portion of the first groove of the first turbine component;
providing at least one second coating on at least a portion of the second groove of the second turbine component; and
wherein the first groove having the first coating and the second groove having the second coating which together form a coated seal slot extending across a gap formed between the first turbine component and the second turbine component, and a seal being disposable in the coated seal slot and engageable with the first coating and the second coating to inhibit leakage of gas through the gap, wherein the providing the first coating comprises applying a slurry in the first groove of the first turbine component, scraping some of the slurry from the first groove, and heat treating the remaining slurry in the first groove of the first turbine component, and the providing the second coating comprises applying a slurry in the second groove of the second turbine component, scraping some of the slurry from the second groove, and heat treating the remaining slurry on the second groove of the second turbine component.

3. A method for forming a coated seal slot for turbomachinery, the method comprising:
providing a first turbine component having a first groove;
providing a second turbine component having a second groove;
providing at least one first coating on at least a portion of the first groove of the first turbine component;
providing at least one second coating on at least a portion of the second groove of the second turbine component; and
wherein the first groove having the first coating and the second groove having the second coating which together form a coated seal slot extending across a gap formed between the first turbine component and the second turbine component, and a seal being disposable in the coated seal slot and engageable with the first coating and the second coating to inhibit leakage of gas through the gap, wherein the providing the first coating comprises bulk filling the first groove of the first turbine component with a slurry, drying or heat treating the slurry in the first groove of the first turbine component, and removing a portion of the dried or heat treated slurry to form the first coating, and the providing the second coating comprises bulk filling the second groove of the first turbine component with a slurry, drying or heat treating the slurry in the second groove of the first turbine component, and removing a portion of the dried or heat treated slurry to form the second coating.

4. The method of claim 3 wherein the removing the portion of the dried or heat treated slurry to form the first coating comprises machining the dried or heat treated slurry, and the removing the portion of the dried or heat treated slurry to form the second coating comprises machining the dried or heat treated slurry.

5. The method of claim 3 wherein the removing the portion of the dried or heat treated slurry to form the first coating comprises electrical discharge machining, laser machining, milling, wire saw grooving, or semiconductor dicing sawing the dried or heat treated slurry, and the removing the portion of the dried or heat treated slurry to form the second coating comprises electrical discharge machining, laser machining, milling, wire saw grooving, or semiconductor dicing sawing the dried or heat treated slurry.

* * * * *